US005915794A

United States Patent [19]

Neff

[11] Patent Number: 5,915,794

[45] Date of Patent: Jun. 29, 1999

[54] HAND SCRAPER WITH IMPROVED GRIP

[75] Inventor: Chris Neff, Waterloo, Ill.

[73] Assignee: Designer Floors, Inc., Waterloo, Ill.

[21] Appl. No.: 09/013,958

[22] Filed: Jan. 27, 1998

[51] Int. Cl.[6] .......... A47L 13/022; A01B 1/22; B25G 1/04

[52] U.S. Cl. .......... 30/169; 30/171; 15/143.1; 15/144.4; 15/236.01

[58] Field of Search .......... 30/169, 171, 314, 30/315, 340, 342, 344, 164.5; 15/143.1, 144.1, 144.4, 236.01

[56] References Cited

U.S. PATENT DOCUMENTS

| | | | |
|---|---|---|---|
| 538,010 | 4/1895 | Carriere | 30/169 |
| 725,480 | 4/1903 | Price | 30/169 |
| 1,018,518 | 2/1912 | Pettit | 30/169 |
| 1,386,249 | 8/1921 | Gander | 30/169 |
| 1,437,199 | 11/1922 | Same | 30/169 |
| 2,236,323 | 3/1941 | Stachowiak | 30/169 |
| 2,693,384 | 11/1954 | Clarke | 30/169 |
| 4,690,724 | 9/1987 | Outlaw | 30/169 |
| 4,809,436 | 3/1989 | Crookston | 30/171 |
| 5,435,063 | 7/1995 | Russo | 30/344 |
| 5,606,761 | 3/1997 | Lynch | 30/169 |

*Primary Examiner*—Hwei-Siu Payer
*Attorney, Agent, or Firm*—Bruce E. Burdick

[57] ABSTRACT

A simple sturdy multiply adjustable hand scraper has a knurled cross handle mounted on a shaft and an obliquely mounted blade on the other end of the shaft, the handle being adjustably set at an angle relative to the blade.

11 Claims, 1 Drawing Sheet

HAND SCRAPER WITH IMPROVED GRIP

BACKGROUND OF THE INVENTION

1. Field of the Invention

This invention relates to floor scrapers and particularly to those with short handles.

2. Related Art

Hand scrapers are a tool in common current use for removing floor covering such as vinyl tiles. These scrapers usually have a shaft with a cross mounted blade at one end. A manual snow pusher is an example of a large hand scraper. Smaller scrapers have a straight handle shaft, usually with a handgrip placed over the end opposite the blade. Such a typical structure in shown in FIG. 1 of the drawing. The blade is pushed hard to remove floor tiles or carpet parts adherent to the floor. This leads to difficulty in maintaining a grip on the scraper during use. Smaller scrappers are usually much simpler than the longer scrapers. A hand scraper is needed that is more reliable and sturdy.

SUMMARY OF THE INVENTION

It is in view of the above problems that the present invention was developed.

It is an object of the invention to provide a sturdy short scraper.

It is a further object of the invention to provide a short scraper that is less susceptible to twisting and easier for the user to hold.

The invention achieves these objects by providing a simple sturdy short hand scraper of adjustable length with a transverse, knurled, shovel-type handle of adjustable angular orientation relative to the blade.

The hand scraper of the invention comprises a shaft, a crossblade on a first end of the shaft, a U-shaped handle bracket on a second end of the shaft opposite the first end, a knurled handle mounted in the U-shaped bracket perpendicularly transverse to the shaft, said bracket being rotatable on the second end to allow for the handle to be at a radial angle relative to the blade.

These objects, advantages and structures will be more easily understood by reference to the enclosed drawing.

Further features and advantages of the present invention, as well as the structure and operation of various embodiments of the present invention, are described below in detail.

The invention will be better understood by reference to the accompanying drawing which consists of two exemplary figures showing the "best mode" (preferred embodiment) currently known to the present inventor or inventors of the invention, and which are not intended to describe all variations which might be within the scope of the invention as claimed below, but rather to illustrate the claimed invention such as to enable one of ordinary skill in the relevant art to make and use the claimed invention. It is noted that since the intention is to have a very adjustable structure, the best scraper is not necessarily the most complex. Hence the simple scraper shown should not be interpreted to mean that more complex scrapers are outside the scope of the invention since even complex scrapers may use the inventive features described below to advantage.

BRIEF DESCRIPTION OF THE DRAWINGS

The drawing includes

DESCRIPTION OF THE PREFERRED EMBODIMENTS

Figure 2:
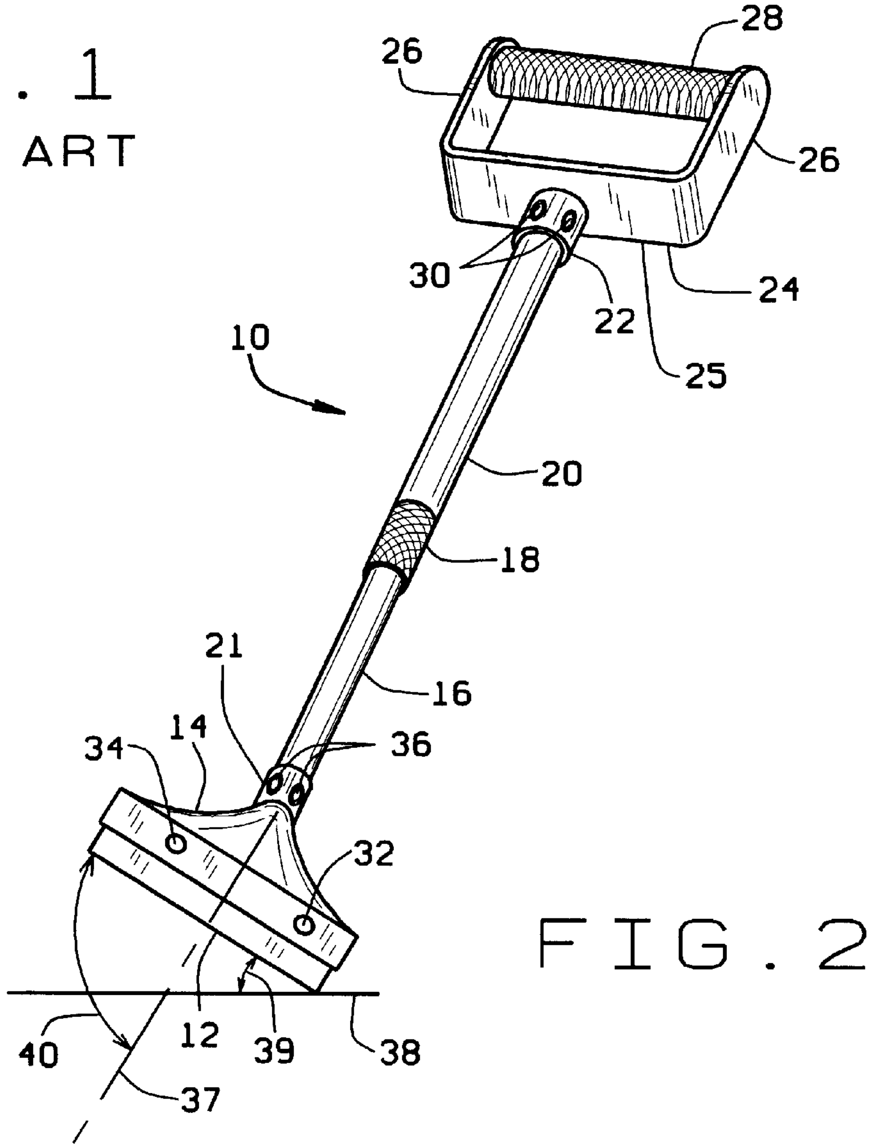

The invention will be described by reference to FIG. 2. The embodiment of the invention shown there is a hand scraper 10, comprising six parts: a blade 12, a blade clamping head 14, a telescopically extendable and contractible shaft 16,20, a bracket 24 rotably mounted a second end of the shaft, a knurled metal handle 28 mounted in the bracket, and fasteners 30, 32, 34 and 36 to hold the blade in the clamping head and bracket at a desired angle relative to each other. If desired, the shaft can be made solid and non-telescopic for added rigidity and sturdiness and one set of fasteners 30 or 36 could be eliminated so that either the head or handle bracket are rigidly attached to the shaft, but not both.

In all this it is seen that a simple construction is achieved which is sturdy and yet flexible in use. In use the shaft 16, 20 can be adjusted to a desired length and then lock sleeve 18 can be turned to hold the shaft at the desired short length. The clamping head 14 and handle bracket 24 can be set by set screws 36 and 30 in sleeve 21 and 22 on the head 14 and the bottom 25 of the bracket 24 at any desired rotary position relative to each other. Blade 12 can be set perpendicular to the axis of shaft 16, 20 or can be at an angle relative thereto as is more common.

This construction of the hand scraper includes a shaft of less than three feet in length. The shaft has an axis; U-shaped handle bracket 24 centered on, and rotatably attached to, a first end of the shaft, a knurled metal handle mounted in the arm 26 of the bracket orthogonally to the axis of the shaft, a blade mount head attached to the opposite end of the shaft from the bracket; a crossblade mounted in the blade mount head at an oblique angle 39 to the shaft; and a radial fastener releasably locking the rotational position of either the blade mount head or the handle relative to the shaft. The scraper preferably includes a second radial fastener 36 for releasably locking the rotational position of the other of the head and handle relative to the shaft. The fasteners 30 and 36 are set screws, although other releasable fasteners such as metal screws, bolts, clamps and the like could be used. The set screws 30 are preferably positioned less than 180 degrees apart and facing a common side of the shaft as the releasable blade fasteners 34 face, whereby access to all four fasteners is possible from the same side. In the event the bracket 24 is immovably affixed to the shaft and instead the head 14 is mounted with set screws 36, then those set screws would preferably be mounted less than 180 degrees apart for the same reason. The knurled handle 28 is metallic for greater sturdiness. The handle is welded to the bracket for better rigidity. The head is shown removably mounted, but would preferably be permanently and immovably mounted on the shaft since the handle bracket can be adjusted to set the relative rotational angle 39 between the head and handle. That is, it will be understood that rotational angle 40 of the blade on the axis 37 of the shaft 16,20 is set by loosening either screws 30 or 36, or both, then rotating the handle 28 relative to the blade 12 about the axis 37 of shaft 16, and then tightening screws 30 and 36 to set the relative rotational angle 40. Thus, when the handle is held horizontal, the blade is tilted in the vertical direction by angle 40. Those of ordinary skill in the art will understand from FIG. 2 that the angle 40 is adjusted for the comfort of the user, and that in actual use floors are usually horizontal and the blade would thus be horizontal and the handle tilted relative to the blade.

This is more comfortable for some users. If shaft portions 16 and 20 can be rotated relative to each other, the angle could also be set by loosening lock sleeve 18, rotating the lower portion 16 of the shaft relative to the upper portion 20 of the shaft and then tightening lock sleeve 18. In the horizontal plane, as shown in FIG. 2, an acute cutting angle 39 is created between the orthogonal orientation of handle 28 relative to axis 37 as shown by line 38 and the front edge of blade 12, as seen in FIG. 2. This cutting angle is created by tilting clamping head 14 so that screw 34 is closer to handle 28 than is screw 32, and this cutting angle is pre-set by the construction of clamping head 14.

The shaft 16, 20 is shown as a telescopic shaft with a lock 18 to hold its length at some desired distance under three feet. This would allow the scraper to be customized for an individual person. Professional installers generally have a handle length they always use. In that case, the shaft would be made of a single non-telescoping piece without any lock 18. In that way the shaft would be simpler, sturdier and less expensive for professional use, which should give longer useful life.

The blade 12 would be any current of future blade commercially available. Professional installers generally use standard blades since that is the one part of the scraper which is most likely to wear out. Blades sometimes chip or break as do various parts of the scraper. This scraper, however, will be recognized as a very sturdy configuration that makes every part of the scraper adjustable to suit a professional installer, who needs to adapt the scraper to his particular body dimensions and then use it many times nearly every day. A small increase in cost of the scraper to achieve such sturdiness is negligible to the professional who must use the tool every day and who is concerned about comfort and avoidance of injury. The high adjustability of this scraper aids in positioning the rotational position of a hand scraper such that torque on the hand and arm of the user is minimized.

Figure 1:
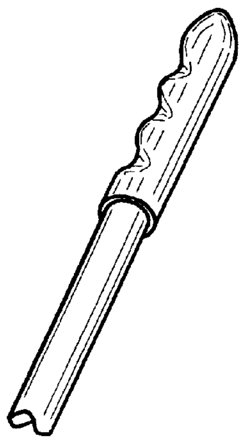
FIG. 1 PRIOR ART
FIG. 1, a left, front, top perspective view of a typical prior art handle assembly, and FIG. 2, a left, front, top perspective view of the preferred simple sturdy hand of the invention.

The above hand scraper comprising: a shaft of less than three feet in length having an axis, a U-shaped handle bracket centered on and rotatably attached to a first end of the shaft, a knurled metal handle mounted in the bracket orthogonally to the axis of the shaft, a blade mount head attached to the opposite end of the shaft from the bracket, a crossblade mounted in the blade mount head at an oblique angle to the shaft, and a radial fastener releasably locking the radial angle of the handle relative to the bracket is therefore seen as particularly advantageous in contrast with the prior art. The orthogonal orientation of the handle to the shaft (i.e. perpendicular to the longitudinal axis of the shaft) minimizes the torque on the user's hand and arm. The knurled handle reduces the danger of injury due to hand slippage, which will, by hindsight, be recognized as a clear and obvious danger of the prior art handle of FIG. 1. Also as noted, the blade mounting head is preferably permanently and immovably mounted on the shaft, such as by welding it to the shaft to prevent injury due to rotational slippage of the blade head. Likewise, the shaft is preferably not telescopic to prevent injury due to telescopic collapse (i.e. sudden unexpected failure of lock 18.) It is thus apparent that extraordinarily thorough consideration has been given to the professional user and his safety in using the hand scraper of the invention. Complexity has been increased (such as in the knurled, rotationally adjustable, orthogonally mounted handle) where it is important for the safety and comfort of the user. Complexity is preferably reduced such as in elimination of rotational adjustability of the head 14 on shaft 16 and the elimination of a telescopic shaft 16, 18, 20 where not needed for the professional user to reduce the chance of injury. The recognition of where to simplify and where to make complex is a particular contribution of this invention to the benefit of the public and thus confers a benefit of the public that is a most fair bargain in return for issuance of appropriately broad patent claims.

In view of the foregoing, it will be seen that the stated objects of the invention are achieved and even exceeded. The above description explains the principles of the invention and its practical application to thereby enable others skilled in the art to best utilize the invention in various embodiments and with various modifications as are suited to the particular use contemplated. Some of those modifications are described in great detail above and others only briefly, depending on the need for the same. As various modifications could be made in the constructions and methods herein described and illustrated, particularly in materials, sizes and shapes, without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A hand scraper comprising: a shaft of less than three feet in length having an axis, a U-shaped handle bracket having a bottom portion transverse to the shaft axis and two arms rigidly connected to the shaft and disposed parallel to the shaft, a first sleeve rigidly attached to a center of the bottom portion of the bracket and centered on and attached to a first end of the shaft, a knurled metal handle mounted in the bracket transversely and orthogonally to the axis of the shaft, a blade mount head having a second sleeve rigidly affixed to one end of the head, that second sleeve being coaxial with and attached to the opposite end of the shaft from the bracket, an elongated blade disposed transversely to the axis of the shaft mounted in the blade mount head at an oblique angle to the shaft, and a pair of circumferentially spaced set screws passing through at least one of the sleeve and adjustably affixing said of least one of the sleeves to the shaft in a first selected rotational position relative to the shaft to thereby serve as a radial fastener releasably and adjustably locking the rotational angle of the handle relative to the shaft.

2. The scraper of claim 1 further comprising a second radial fastener for releasably and adjustably locking the rotational angle of the other of the sleeves relative to the shaft, and thereby setting the rotational position of the head relative to the handle.

3. The scraper of claim 2 wherein the second radial fastener is a pair of set screws passing radially through the other one of the two sleeves.

4. The scraper of claim 1, wherein further comprising a pair of fasteners releasably securing the blade to the mount head, the set screws being positioned within an arc around the axis of the shaft of less than 180 degrees and facing a common side of the shaft as the pair of blade fasteners face, whereby access to the pair of fasteners and the set screws is possible from the same side of the hand scraper.

5. The scraper of claim 1, wherein the set screws in said at least one of the sleeves are positioned less than 90 degrees apart circumferentially and face toward the top of the hand scraper.

6. The scraper of claim 5 wherein the handle is welded to an upper portion of the arms of the bracket.

7. The scraper of claim 1 wherein the blade mount head is permanently and immovably mounted on the shaft, but the handle bracket is removably mounted on the shaft by the set screws.

8. The scraper of claim 1 wherein the blade mount head is permanently and immovably mounted on the shaft, but the handle bracket is removably mounted on the shaft by the set screws.

9. The scraper of claim 1, wherein the shaft has upper and lower portions with one of the portions being telescopically slidably mounted in the other and selectively secured to the other in an adjustable longitudinal and rotational relationship by a releasable lock.

10. The scraper of claim 9, wherein the releasable lock is a locking sleeve.

11. The scraper of claim 10, having a second pair of set screws passing radially through the other of the two sleeves.

* * * * *